US011728908B2

(12) United States Patent
Thiruvarankan (10) Patent No.: US 11,728,908 B2
(45) Date of Patent: Aug. 15, 2023

(54) ANTENNA ARRAYS FOR TESTING WIRELESS DEVICES

(71) Applicant: Keysight Technologies Singapore (Sales) Pte. Ltd., Singapore (SG)

(72) Inventor: Rajaratnam Thiruvarankan, Beaverton, OR (US)

(73) Assignee: Keysight Technologies Singapore (Sales) Pte., Ltd., Singapore (SG)

( * ) Notice: Subject to any disclaimer, the term of this patent is extended or adjusted under 35 U.S.C. 154(b) by 1055 days.

(21) Appl. No.: 16/380,926

(22) Filed: Apr. 10, 2019

(65) Prior Publication Data

US 2019/0238238 A1 Aug. 1, 2019

Related U.S. Application Data

(62) Division of application No. 15/234,888, filed on Aug. 11, 2016, now Pat. No. 10,313,031.

(51) Int. Cl.
*H04B 17/10* (2015.01)
*G01R 29/10* (2006.01)
*H04B 17/00* (2015.01)

(52) U.S. Cl.
CPC ....... *H04B 17/101* (2015.01); *H04B 17/0085* (2013.01)

(58) Field of Classification Search
CPC .... H04B 17/101; H04B 17/0085; H01Q 1/50; H01Q 1/38; G01R 29/10
See application file for complete search history.

(56) References Cited

U.S. PATENT DOCUMENTS

| | | | |
|---|---|---|---|
| 6,657,214 B1 * | 12/2003 | Foegelle | G01R 29/0821 333/228 |
| 10,313,031 B2 | 6/2019 | Thiruvarankan | |
| 2005/0135258 A1 | 6/2005 | Amrod et al. | |
| 2006/0055604 A1 | 3/2006 | Koenig | |
| 2007/0018903 A1 | 1/2007 | Mohamadi | |
| 2008/0020746 A1 | 1/2008 | Alexandar et al. | |
| 2008/0056340 A1 * | 3/2008 | Foegelle | H04B 17/0082 375/224 |
| 2009/0009399 A1 | 1/2009 | Gaucher et al. | |
| 2009/0094492 A1 | 4/2009 | Music et al. | |
| 2014/0141728 A1 | 5/2014 | Devarasetty et al. | |
| 2014/0266929 A1 | 9/2014 | Huynh et al. | |

(Continued)

OTHER PUBLICATIONS

Notice of Allowance and Fee(s) Due for U.S. Appl. No. 15/234,888 (dated Jan. 28, 2019).

(Continued)

*Primary Examiner* — Hoang V Nguyen (57) ABSTRACT

A test system includes a radio frequency (RF) shielded chamber and an antenna array in the RF shielded chamber. The antenna array includes groups of antenna elements and power combiners. Each group of antenna elements is matched to a matching group of antenna elements by virtue of being coupled to a respective power combiner for both the group and the matching group. The antenna array is configured, by virtue of spacing apart the antenna elements by at least half of a wavelength of a test signal for testing a wireless device in the RF chamber, so that power delivered to output ports of the antenna array is substantially uniform regardless of where the wireless device is placed within the RF chamber.

7 Claims, 5 Drawing Sheets

(56) References Cited

U.S. PATENT DOCUMENTS

| | | |
|---|---|---|
| 2015/0092824 A1 | 4/2015 | Wicker, Jr. et al. |
| 2015/0318622 A1* | 11/2015 | Pruett ................. H01Q 21/061 |
| | | 343/893 |
| 2015/0358337 A1* | 12/2015 | Keller ................. H04W 12/128 |
| | | 726/23 |
| 2015/0369851 A1 | 12/2015 | Even et al. |
| 2015/0372842 A1 | 12/2015 | Wicker, Jr. et al. |
| 2018/0034563 A1 | 2/2018 | Foegelle |
| 2018/0048399 A1 | 2/2018 | Thiruvarankan |

OTHER PUBLICATIONS

Restriction Requirement for U.S. Appl. No. 15/234,888 (dated Apr. 30, 2017).

"WaveChamber TM RF Isolation Enclosure," ixia Data Sheet, Document No. 915-6018-01 Rev B, p. 1-4 (Jun. 2015).

\* cited by examiner

ANTENNA ARRAYS FOR TESTING WIRELESS DEVICES

RELATED APPLICATIONS

This application is a divisional of U.S. patent application Ser. No. 15/234,888, filed Aug. 11, 2016; the disclosure of which is incorporated herein by reference in its entirety.

TECHNICAL FIELD

The subject matter described in this specification relates generally to testing wireless devices and more particularly to antenna arrays for testing wireless devices in a controlled electromagnetic environment.

BACKGROUND

Sophisticated wireless data communications devices, systems and networks, such as cellular telephones and wireless LAN transceivers, are in widespread use worldwide. There is increasing need for higher data rates and the support of an increased number of users and data traffic, and these networks employ complex signal waveforms and advanced radio frequency capabilities such as multiple-input multiple-output (MIMO) signal coding for achieving higher bandwidths. Further, the rapidly decreasing physical size and power consumption of these devices and systems cause them to become ever more highly integrated, with internal antennas and fully sealed construction. All of these techniques, however, increase the complexity of the wireless devices. Manufacturers, vendors and users therefore have a greater need for better testing of such systems.

Accordingly, there exists a need for systems for testing wireless devices and particularly for antenna arrays for testing wireless devices in a controlled electromagnetic environment.

SUMMARY

A test system includes a radio frequency (RF) shielded chamber and an antenna array in the RF shielded chamber. The antenna array includes groups of antenna elements and power combiners. Each group of antenna elements is matched to a matching group of antenna elements by virtue of being coupled to a respective power combiner for both the group and the matching group. The antenna array is configured, by virtue of spacing apart the antenna elements by at least half of a wavelength of a test signal for testing a wireless device in the RF chamber, so that power delivered to output ports of the antenna array is substantially uniform regardless of where the wireless device is placed within the RF chamber.

DETAILED DESCRIPTION

Figure 1A:
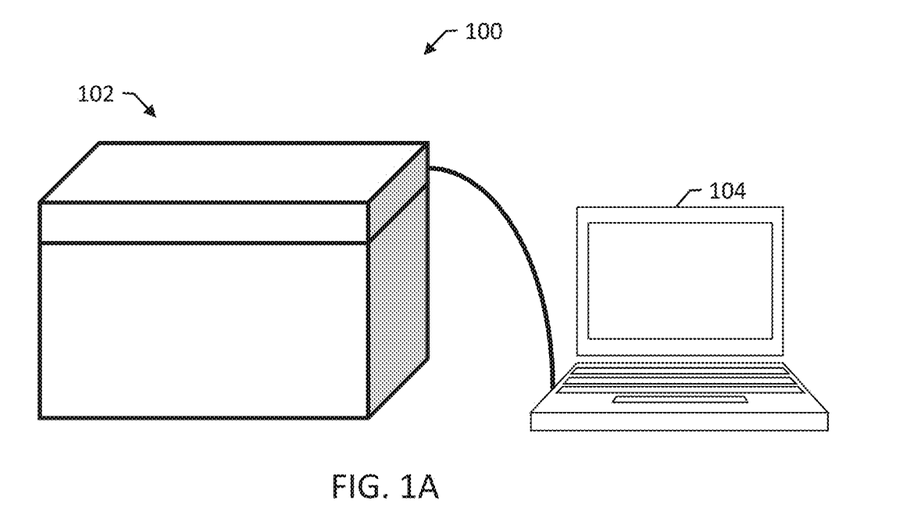
FIG. 1A is a perspective view of an example system for testing wireless devices.

FIG. 1A is a perspective view of an example system 100 for testing wireless devices. System 100 includes a radio frequency (RF) shielded chamber 102 and a test system 104. Test system 104 is a computer system configured, by virtue of appropriate programming, to test wireless devices placed inside RF shielded chamber 102 and record test results for the wireless devices.

RF shielded chamber 102 is a structure having an outer shield layer and an interior space for holding wireless devices to test. The outer shield layer reduces outside RF electromagnetic fields (e.g., having frequencies in the range from around 3 kHz to 300 GHz) from reaching the interior space, e.g., by virtue of the size, shape, and thickness of the outer shield layer and the material composition of the outer shield layer. For example, the outer shield layer can include copper for RF shielding. RF shielded chamber 102 includes a mechanism for accessing the interior space, for example, a hinged door.

Figure 1B:
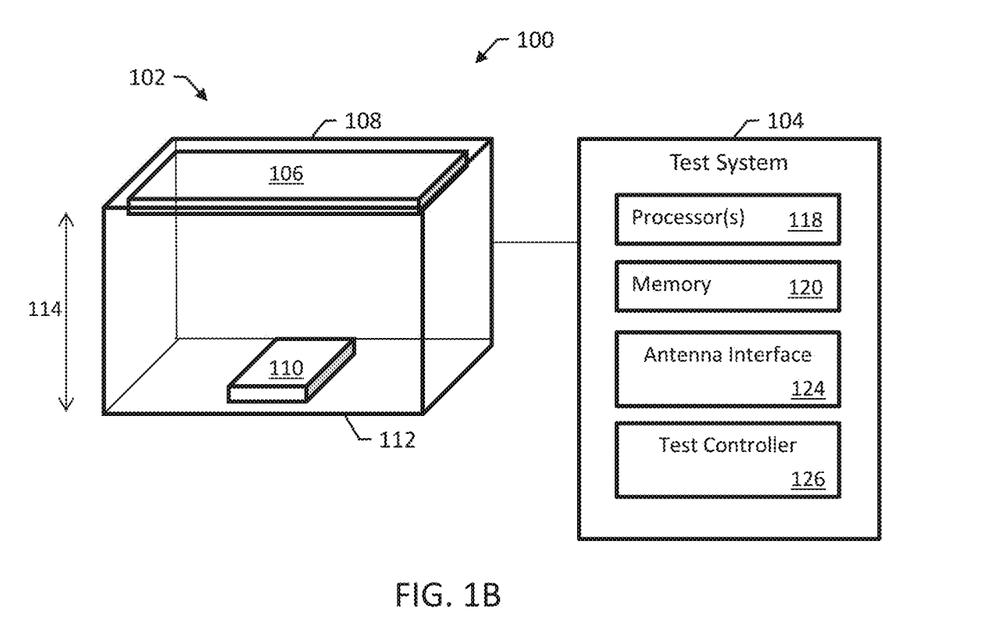
FIG. 1B is a diagram of the example system showing a transparent view of RF chamber and a block diagram of test system.

FIG. 1B is a diagram of the example system 100 showing a transparent view of RF chamber 102 and a block diagram of test system 104. The transparent view of RF chamber 102 shows an antenna array 106 mounted on a first interior surface 108 of RF chamber 102. The transparent view also shows a device under test (DUT) 110 supported by a second interior surface 112 of RF chamber 102 opposite first interior surface 108.

First interior surface 108 and second interior surface 112 of the RF chamber are spaced apart by an interior distance 114 so that DUT 110 is in the far field with respect to antenna array 106. DUT 110 is in the far field when interior distance 114 is sufficiently long so that radiation from antenna array 106 decreases as the square of the distance from antenna array 106 and absorption of radiation does not feed back to antenna array 106. The minimum necessary distance for interior distance 114 will depend on, e.g., the types of antenna elements used in antenna array 106 and the frequencies of test signals.

DUT 110 can be any appropriate device for receiving and/or transmitting RF signals. DUT 110 typically includes at least a processor, a wireless chip, and an antenna. For example, DUT 110 can be a mobile phone, a tablet computer, a Bluetooth enabled device, a wireless router, and so on.

Test system 104 includes one or more processors 118 and memory 120 storing executable instructions for processors 118. Test system 104 further includes an antenna interface circuit 124 and a test controller 126. Test controller 126 can be implemented as executable instructions stored in memory 120 and loaded into random access memory (RAM) for execution by processors 118. Antenna interface circuit 124 is a circuit for energizing antenna array 106 with RF test signals and receiving RF test signals from DUT 110. For example, antenna interface circuit 124 can include a waveform generator.

In operation, test controller 126 performs testing on DUT 110 and stores test results for DUT 110. For example, test controller 126 can transmit, using antenna interface circuit 124 to energize antenna array 106, a test signal to DUT 110 and receive a responsive test signal from DUT 110. Test controller 126 can perform any appropriate sequence of transmitting and receiving test signals to evaluate DUT 110.

Test controller 126 then stores a test result for DUT 110 based on the received test signals.

For example, a system administrator can place DUT 110 into RF chamber 102 and then direct (e.g., using a user input device and display of test system 104) test controller 126 to execute a test script that is specific to a kind of wireless device for DUT 110. In another example, test controller 126 receives information, e.g., a model number or serial number, from DUT 110 by a wireless communications channel, and test controller 126 executes an appropriate test script for DUT 110 based on the received information.

Test controller 126 can store any appropriate information for the test result. For example, test controller 126 can compare the received signal to a target signal and store a "pass" or "fail" for DUT 110 depending on whether the received signal sufficiently matches the target signal, along with a device identifier for DUT 110. In another example, test controller 126 can store data characterizing the waveform of the received signal. Test controller 126 can send the stored test results to another computer system or display test results on a display.

Antenna array 106 is configured, by virtue of spacing apart antenna elements of antenna array 106, so that power delivered to output ports of antenna array 106 is substantially uniform regardless of where DUT 110 is placed within RF chamber 102. In other words, the power delivered to each output port is the same or substantially the same with respect to system 100, i.e., the power delivered to each port has a magnitude that is similar enough to the power delivered to every other port so that that port-to-port differences can be disregarded by test controller 126.

This is useful, for example, so that DUT 110 does not have to be precisely placed within RF chamber 102. RF chamber 102 can therefore be used, e.g., to test devices of varying sizes and shapes. Moreover, a system administrator or robot that places DUT 110 into RF chamber 102 needs relatively less training in comparison to using a system that requires precise placement.

Figure 2A:
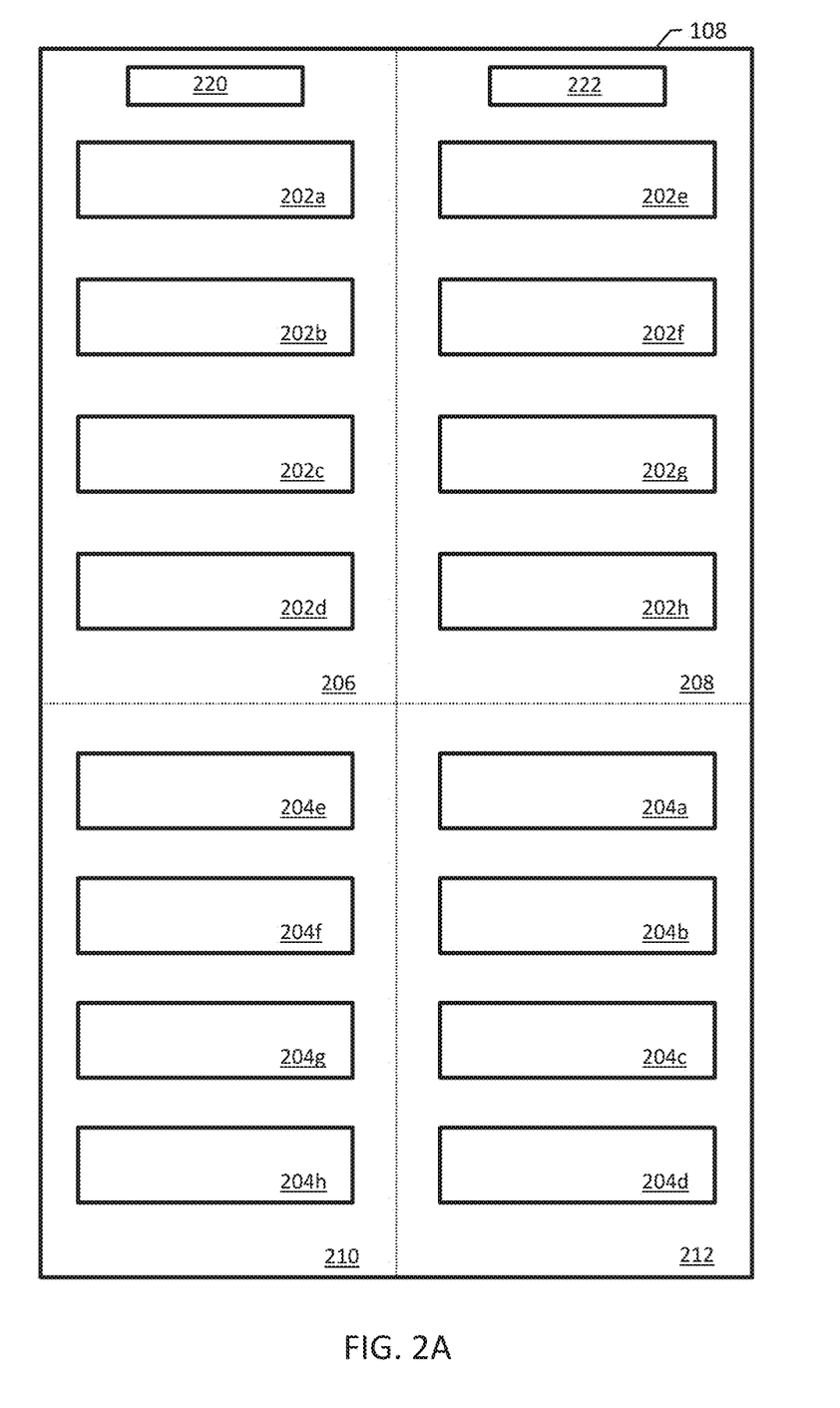
FIG. 2A is a block diagram of an example antenna array.

FIG. 2A is a block diagram of an example antenna array 108. Antenna array 108 includes groups of antenna elements 202a-h and 204a-h and power combiners coupled to rows of output ports 220 and 222. Each group of antenna elements includes a number of antenna elements, e.g., a pair of antenna elements or two pairs of antenna elements. An antenna element can be, e.g., a fractal antenna or any appropriate type of antenna.

Figure 3:
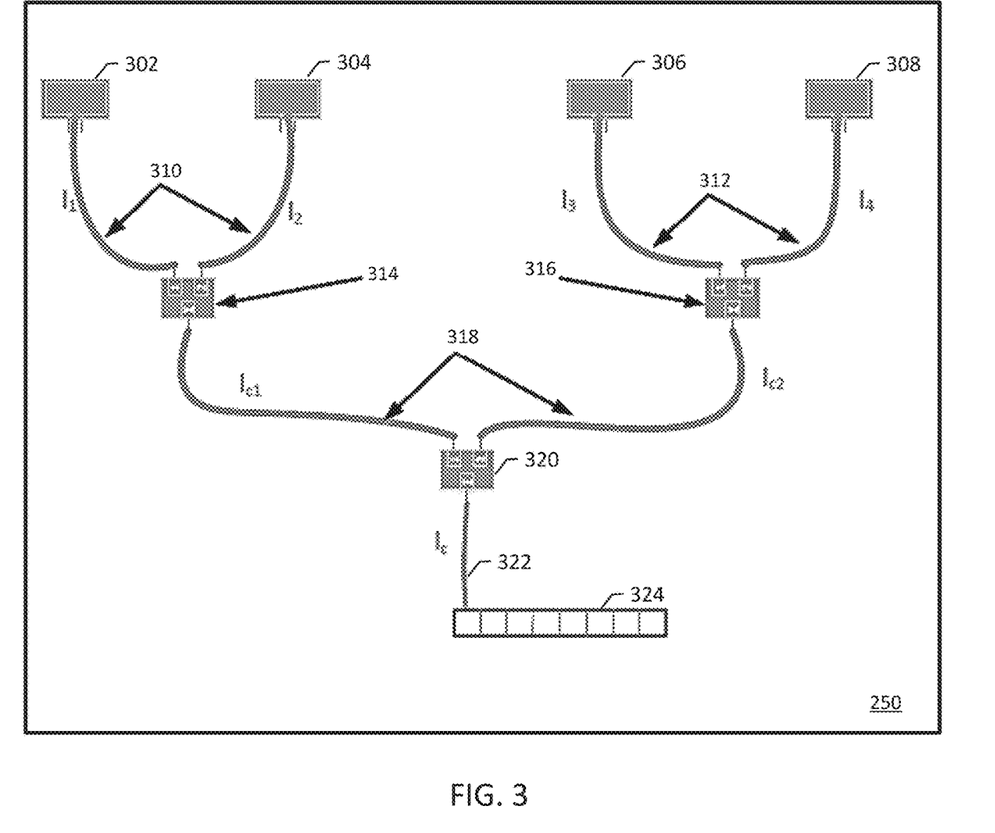
FIG. 3 is a diagram illustrating an example configuration of power combiners for the antenna array.

Each group of antenna elements 202a-h is matched to a matching group of antenna elements 204a-h by virtue of being coupled to a respective power combiner for both the group and the matching group. For example, group 202a is matched to group 204a because the antenna elements in group 202a are coupled to a same power combiner as the antenna elements in group 204a. Power combiners are shown in FIG. 3 and described further below with reference to FIG. 3.

In the example shown in FIG. 2A, the antenna elements are spaced apart in a rectangular grid having four quadrants 206, 208, 210, and 212. Each quadrant is a general region of the antenna array and quadrants 206, 208, 210, and 212 may or may not be the same size and area. Quadrants 206, 208, 210, and 212 are depicted to illustrate the arrangement of antenna elements and quadrants 206, 208, 210, and 212 need not correspond to any physical features of antenna array 108.

For each group and matching group of antenna elements, the antenna elements of the group and the matching group are mirrored on opposite quadrants of the rectangular grid. For example, group 202a and matching group 204a are mirrored because group 202a is in the top-left (as seen by the viewer of FIG. 2A) quadrant 206 and group 204a is in the bottom-right quadrant 212. Similarly, group 202e and matching group 204e are mirrored because group 202e is in quadrant 208 and group 204e is in quadrant 210.

Moreover, group 202a can be the top-most group of antenna elements in quadrant 206 and group 204a can be the top-most group of antenna elements in quadrant 212. Similarly, group 202d can be the bottom-most group of antenna elements in quadrant 206 and group 204d can be the bottom-most group of antenna elements in quadrant 212. So the top-to-bottom ordering of groups can be maintained as the groups and matching groups are mirrored on opposite quadrants of the rectangular grid. Mirroring groups and matching groups in this manner can be useful, e.g., to maximize the distance between groups and matching groups of antenna elements.

Figure 2B:
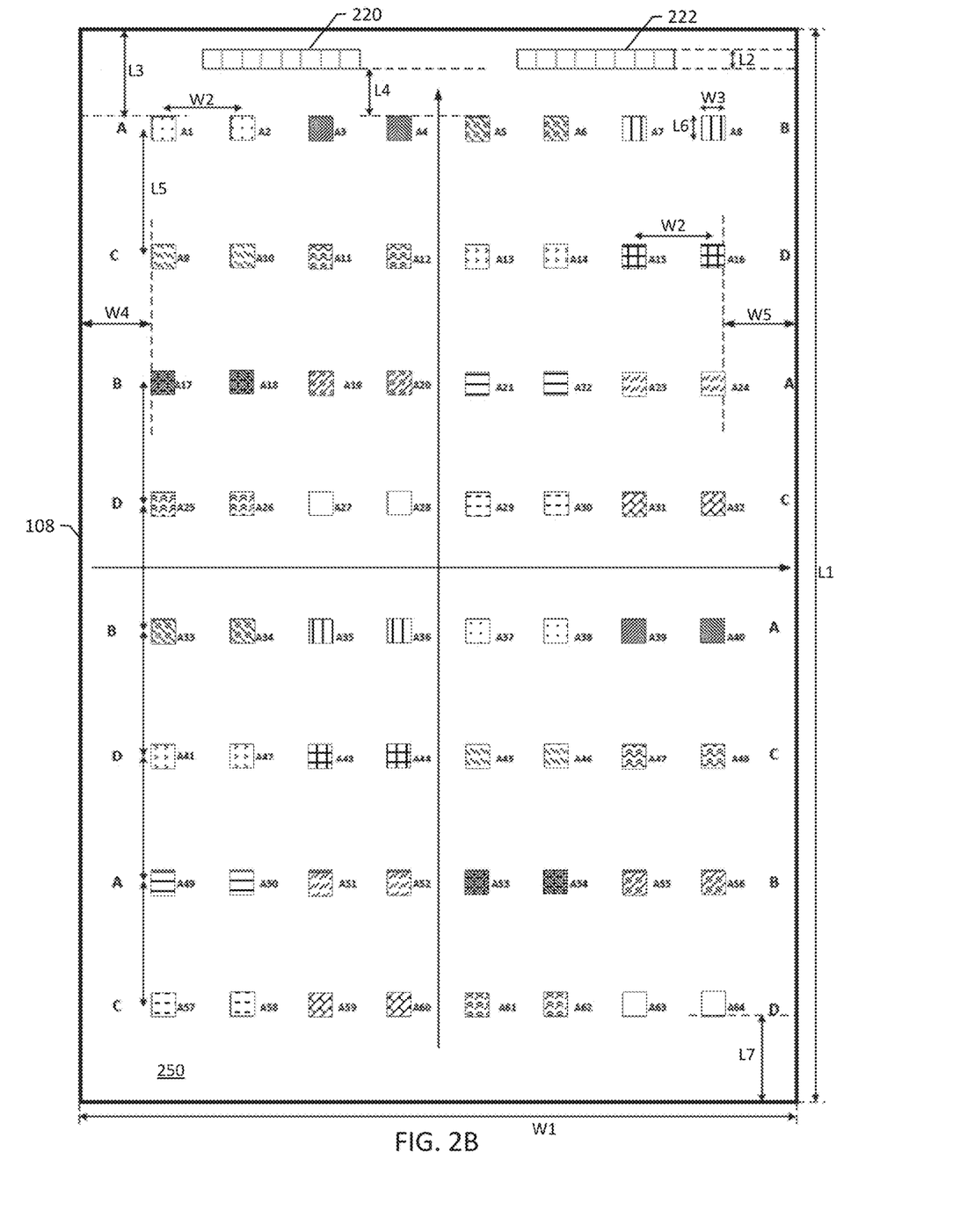
FIG. 2B is a diagram of an example layout of antenna elements for the antenna array.

FIG. 2B is a diagram of an example layout of antenna elements for the antenna array 108. Antenna array 108 includes 64 antenna elements, labelled A1-A64, spaced apart in a rectangular grid having eight rows and eight columns. The antenna elements are mounted on a printed circuit board (PCB) 250.

PCB 250 can be made of any appropriate dielectric material, e.g., FR-4 material or ThunderClad 2 (TU-883) material available from Taiwan Union Technology Corporation (TUC), a Taiwanese company. TU-883 is a very low loss category material based on a high performance modified FR-4 resin. This material is reinforced with regular woven E-glass and designed with a very low dielectric constant (less than 4.0) and dissipation factor (less than 0.005) resin system for high speed, low loss, radio frequency and wireless applications. For example, the material can have a dielectric constant of 3.66 and a dissipation factor of 0.0037.

PCB 250 has a width W1 in a lateral direction and a length L1 in a vertical direction. For example, W1 can be 317.7 mm and L1 can be 508.0 mm. Output connectors 220 and 222 can have a length L2 of, e.g., 8.53 mm. The first row of antenna elements A1-A8 can be spaced apart from the top of PCB 250 by a length L3 of, e.g., 59.8 mm to accommodate output connectors 220 and 222.

The first row of antenna elements A1-A8 can be spaced apart from connectors 220 and 222 by a length L4 of, e.g., 36.0 mm. The bottom row of antenna elements A57-A64 can be spaced apart from the bottom of PCB 250 by a length of L7 of, e.g., 38.8 mm. The left column of antenna elements A1, A9, A17, A25, A33, A41, A49, and A57 can be spaced apart from the left side of PCB 250 by a width of W4 of, e.g., 13.65 mm. The right column of antenna elements A8, A16, A24, A32, A40, A48, A56, and A64 can be spaced apart from the right side of PCB 250 by a width W5 of, e.g., 13.65 mm.

In some examples, each antenna element A1-A64 is fractal antenna. A fractal antenna is a conductive structure formed using a fractal, self-similar pattern. The conductive structure follows the pattern over two or more scale sizes. Fractal antennas can be compact and useful for multiband or wideband signals. For example, each antenna element A1-A64 can fit into a rectangular footprint having a width W3 of, e.g., 10.4 mm and a length L6 of, e.g., 10.4 mm.

As illustrated in FIG. 2B, the antenna elements A1-A64 are matched into pairs and mirrored on opposite quadrants of PCB 250 as described above with reference to FIG. 2A. Antenna elements A1 and A2 form a group of antenna elements and antenna elements A37 and A38 form a matching group of antenna elements, antenna elements A3 and A4 form a group of antenna elements and antenna elements A39 and A40 form a matching group of antenna elements, and so on.

The antenna elements A1-A64 are spaced apart so that each antenna element is spaced apart from every other antenna element by at least a minimum antenna spacing distance. The minimum antenna spacing distance is half of the wavelength of an RF test signal to be transmitted or received by antenna array 108. For example, the RF test signal may have a frequency in the range of 2.4 GHz to 6 GHz.

The antenna spacing distance can be selected to accommodate the lowest frequency (longest wavelength) signal that is planned to be used for testing. For example, the antenna spacing distance can be based on a 2.4 GHz signal. Further, suppose that PCB 250 has a dielectric constant of 3.66 and strip lines connecting the antenna elements to power combiners have a propagation constant, velocity, and characteristic impedance that does not change with frequency. In that case, the medium is uniform, and the wavelength of the signal at 2.4 GHz is 125/sqrt(3.66)=65.33 mm.

In the example depicted in FIG. 2B, the antenna elements can be laterally spaced apart by a width W2 of, e.g., 40 mm and vertically spaced apart by a length of L5 of, e.g., 57 mm. Since both of the example distances are larger than half of the wavelength of the signal at 2.4 GHz, i.e., 32.67 mm, the antenna elements in that example are spaced apart by at least the minimum antenna spacing distance.

FIG. 3 is a diagram illustrating an example configuration of power combiners for the antenna array 108. FIG. 3 shows a subset of the antenna elements and power combiners in antenna array 108 to illustrate the configuration in more detail than could be shown on a diagram of all of the power combiners.

In FIG. 3, four antenna elements 302, 304, 306, and 308 are depicted. Antenna elements 302 and 304 form a group of antenna elements and antenna elements 306 and 308 form a matching group of antenna elements. For example, antenna elements 302 and 304 can be antenna elements A1 and A2 from FIG. 2B, and antenna elements 306 and 308 can be antenna elements A37 and A38 from FIG. 2B. In another example, antenna elements 302 and 304 can be antenna elements A27 and A28 from FIG. 2B, and antenna elements 306 and 308 can be antenna elements A63 and A64 from FIG. 2B. The antenna elements are coupled by conductive traces on PCB 250, e.g., 50 Ω striplines.

Antenna elements 302 and 304 are coupled by striplines 310 of lengths I1 and I2 to a first intermediate power combiner 314. Antenna elements 306 and 308 are coupled by striplines 312 of lengths I3 and I4 to a second intermediate power combiner 316. Intermediate power combiners 314 and 316 are coupled by striplines 318 of lengths Ic1 and Ic2 to a higher-level power combiner 320. Higher-level power combiner 320 is coupled by a stripline 322 of length Ic to an output connector in a row 324 of output connectors.

To minimize phase offset, lengths I1 and I2 can be different, i.e., different by at least a length relative to the wavelength of the test signal. In some examples, lengths I1 and I2 vary between 132 mm and 140 mm.

Lengths I3 and I4 can be close to each other, e.g., about the same, to minimize the phase difference between the two signals, and lengths I3 and I4 can in some cases be the same as one of lengths I1 and I2. Lengths Ic1 and Ic2 can be the same but need not be the same as lengths I1 and I2 or I3 and I4. In some examples, each path from antenna elements 302, 304, 306, and 308 to the row 324 of output connectors has a same number of vias through PCB 250. In some examples, the lateral or vertical distance on PCB 250 between striplines is the same across PCB 250.

For each of striplines 310, 312, and 318, the source resistance, characteristic impedance of the line, and the load impedance can all be impedance matched, e.g., by selection of width and height of the striplines 310, 312, and 318. The lengths of striplines 310, 312, and 318 can be selected to minimize phase angle differences between signals arriving at the intermediate power combiners and the power combiners. The phase angle of a load voltage can be determined by calculating the delay in the stripline, converting the delay to a phase angle, and subtracting that phase angle from a phase angle of an input voltage of the line. The phase angle is the time delay multiplied by the radian frequency.

Figure 4:
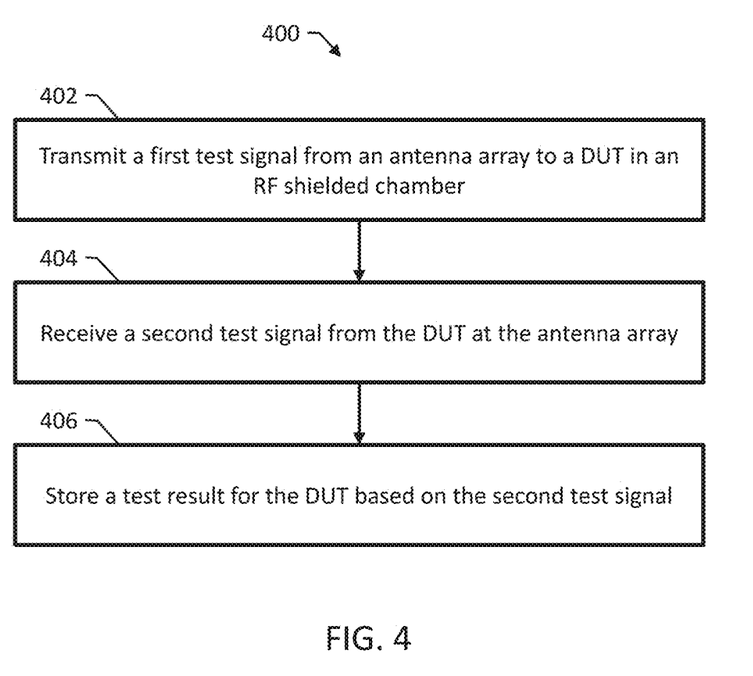
FIG. 4 is a flow diagram of an example method for testing a wireless device.

FIG. 4 is a flow diagram of an example method 400 for testing a wireless device. Method 400 includes transmitting, by an antenna array mounted on a first interior surface of an RF shielded chamber, a first test signal having a first wavelength to a device under test (DUT) supported by a second interior surface of the RF shielded chamber opposite the first interior surface (402). The antenna array includes groups of antenna elements and power combiners. Each group of antenna elements is matched to a matching group of antenna elements by virtue of being coupled to a respective power combiner for both the group and the matching group. The antenna elements are spaced apart so that each antenna element is spaced apart from every other antenna element by at least half of the first wavelength of the first test signal.

In some examples, the first interior surface and the second interior surface of the RF chamber are spaced apart by an interior distance so that the DUT is in the far field with respect to all of the antenna elements. Each antenna element can be, e.g., a fractal antenna. The antenna elements can be mounted on a printed circuit board comprised of TU-883 material, and the antenna elements can be coupled to the power combiners by a striplines.

In some examples, the antenna elements are spaced apart in a rectangular grid having four quadrants. For each group and matching group of antenna elements, the antenna elements of the group and the matching group are mirrored on opposite quadrants of the rectangular grid.

In some examples, for each group and matching group of antenna elements, each of the antenna elements in the group is coupled to a respective intermediate power combiner and each of the antenna elements in the matching group is coupled to a respective matching intermediate power combiner. The intermediate power combiner and matching intermediate power combiner are coupled to the power combiner for the group and the matching group and the power combiner is coupled to a port for the antenna array.

Each of the antenna elements in the group can be coupled to the respective intermediate power combiner by a first conductive trace of a first length and each of the antenna elements in the matching group can be coupled to the respective matching intermediate power combiner by a matching first conductive trace of a second length. For each group and matching group of antenna elements, the intermediate power combiner can be coupled to the power combiner for the group by a second conductive trace of a third length. The lengths of the conductive traces can be selected to minimize phase angle differences between signals arriving at the intermediate power combiners and the power combiners.

Method 400 includes receiving, by the antenna array, a second test signal from the DUT (404). Method 400 includes storing, by a computer system coupled to the antenna array, a test result for the DUT based on the second test signal, e.g., as described above with reference to FIG. 1 (406).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for testing a wireless device, the method comprising:

transmitting, by an antenna array mounted on a first interior surface of an RF shielded chamber, a first test signal having a first wavelength to a device under test (DUT) supported by a second interior surface of the RF shielded chamber opposite the first interior surface, wherein the antenna array comprises a plurality of groups of antenna elements and a plurality of power combiners, wherein each group of antenna elements is matched to a matching group of antenna elements by virtue of being coupled to a respective power combiner for both the group and the matching group, wherein the antenna elements are spaced apart so that each antenna element is spaced apart from every other antenna element by at least half of the first wavelength of the first test signal, wherein the antenna elements are spaced apart in a rectangular grid having four quadrants, and wherein, for each group and matching group of antenna elements, the antenna elements of the group and the matching group are mirrored on opposite quadrants of the rectangular grid;

receiving, by the antenna array, a second test signal from the DUT; and storing, by a computer system coupled to the antenna array, a test result for the DUT based on the second test signal.

2. The method of claim 1, wherein the first interior surface and the second interior surface of the RF chamber are spaced apart by an interior distance so that the DUT is in the far field with respect to all of the antenna elements, and wherein each of the antenna elements is a fractal antenna.

3. The method of claim 1, wherein the antenna elements are mounted on a printed circuit board comprised of dielectric material, and wherein the antenna elements are coupled to the power combiners by a plurality of striplines of the printed circuit board.

4. The method of claim 1, wherein each of the four quadrants spans approximately one quarter of the surface area of the first interior surface of the RF shielded chamber.

5. The method of claim 1, wherein, for each group and matching group of antenna elements, each of the antenna elements in the group is coupled to a respective intermediate power combiner and each of the antenna elements in the matching group is coupled to a respective matching intermediate power combiner, and the intermediate power combiner and matching intermediate power combiner are coupled to the power combiner for the group and the matching group and the power combiner is coupled to a port for the antenna array.

6. The method of claim 5, wherein, for each group and matching group of antenna elements, each of the antenna elements in the group is coupled to the respective intermediate power combiner by a first conductive trace of a first length and each of the antenna elements in the matching group is coupled to the respective matching intermediate power combiner by a matching first conductive trace of a second length.

7. The method of claim 6, wherein, for each group and matching group of antenna elements, the intermediate power combiner is coupled to the power combiner for the group by a second conductive trace of a third length, and wherein the first and second lengths are selected to minimize phase angle differences between signals arriving at the intermediate power combiners and the power combiners.

* * * * *